United States Patent [19]

Linda et al.

[11] Patent Number: 4,815,072
[45] Date of Patent: Mar. 21, 1989

[54] SWITCHING ARRANGEMENTS FOR DIGITAL TELECOMMUNICATIONS EXCHANGE SYSTEMS

[75] Inventors: Martin J. Linda, Bournemouth; Kevin S. Griffin, Christchurch, both of England

[73] Assignee: Plessey Overseas Limited, Ilford, England

[21] Appl. No.: 845,663

[22] Filed: Mar. 28, 1986

[30] Foreign Application Priority Data

Apr. 3, 1985 [GB] United Kingdom ................ 8508740

[51] Int. Cl.$^4$ ............................ H04J 3/22; H04J 3/02
[52] U.S. Cl. ......................................... 370/84; 370/85
[58] Field of Search ...................... 370/85, 88, 84, 56, 370/58; 340/825.05

[56] References Cited

U.S. PATENT DOCUMENTS

| | | | |
|---|---|---|---|
| 4,504,944 | 3/1985 | Johannes | 370/84 |
| 4,511,969 | 4/1985 | Koenig et al. | 370/85 |
| 4,627,052 | 12/1986 | Hoare et al. | 370/85 |
| 4,628,502 | 12/1986 | Boulard et al. | 370/84 |

FOREIGN PATENT DOCUMENTS

| | | |
|---|---|---|
| 0147865 | 7/1985 | European Pat. Off. |
| 0155025 | 9/1985 | European Pat. Off. |
| 8405003 | 6/1983 | PCT Int'l Appl. |
| 2128450 | 4/1984 | United Kingdom |

*Primary Examiner*—Douglas W. Olms
*Assistant Examiner*—Frank M. Scutch, III
*Attorney, Agent, or Firm*—Fleit, Jacobson, Cohn & Price

[57] ABSTRACT

The invention provides switching arrangments for use in digital telecommunications exchange systems for local subscriber access and comprises a selector means (PUBS) which is arranged to interface between a plurality of time division multiplex highway groups (G0 to G3) and a plurality of channel digital traffic paths (C0 to C5). The selector means (PUBS) is microprocessor controlled (MCI) to effect a plurality of different switching connectivity modes enabling bothway communication between various combinations of the time division multiplex highway groups and the channel traffic paths when the input and output data rates (1 Mbit/sec, 64 Mbit/sec or 32 Mbit/sec) of the particular connectivity mode is either compatible or incompatible.

8 Claims, 20 Drawing Sheets

| ADDRESS | WORD |
|---|---|
| 0 | CHAN 0 BYTE 1 |
| 1 | CHAN 0 BYTE 2 |
| 2 | CHAN 1 BYTE 1 |
| 3 | CHAN 1 BYTE 2 |
| 4 | CHAN 2 BYTE 1 |
| 5 | CHAN 2 BYTE 2 |
| 6 | CHAN 3 BYTE 1 |
| 7 | CHAN 3 BYTE 2 |
| 8 | CHAN 4 BYTE 1 |
| 9 | CHAN 4 BYTE 2 |
| 10 | CHAN 5 BYTE 1 |
| 11 | CHAN 5 BYTE 2 |
| 12 | LOOPROUND CONTROL |
| 13 | OFFSET CONTROL |
| 14 | CHANNEL INPUT MONITOR |
| 15 | CHANNEL OUTPUT MONITOR |

Fig.8

TABLE 2

| 6 | 5 | 4 | 3 | 2 | 1 | 0 | |
|---|---|---|---|---|---|---|---|
| CHAN ENABLE | GROUP INPUT SELECT | LSB | GROUP OUTPUT SELECT | | | LSB | BYTE 1 |
| 1MHz MODE | 32/64 K BIT/SEC MODE | | TIME SLOT SELECT | | | LSB | BYTE 2 |
| CHAN DIAG LOOP | LOOP CH5 | LOOP CH 4 | LOOP CH 3 | LOOP CH 2 | LOOP CH 1 | LOOP CH 0 | LOOPROUND CONTROL |
| RESET | OFFSET CH 5 | OFFSET CH 4 | OFFSET CH 3 | OFFSET CH 2 | OFFSET CH 1 | OFFSET CH 0 | OFFSET CONTROL |
| 0 | CHAN 5 | CHAN 4 | CHAN 3 | CHAN 2 | CHAN 1 | CHAN 0 | CHANNEL MONITOR |

Fig. 9

READ CYCLE

WRITE CYCLE

SWITCHING ARRANGEMENTS FOR DIGITAL TELECOMMUNICATIONS EXCHANGE SYSTEMS

FIELD OF THE INVENTION

The present invention relates to switching arrangements for digital telecommunications exchange systems for local subscriber access.

DESCRIPTION OF RELATED ART

The type of telecommunications exchange in which this invention finds utility is based upon a series of multiplexer and concentrator building blocks, each of which can support several subscriber and signalling types. These building blocks can be included in a very flexible range of configurations to meet the users switching system requirements.

SUMMARY OF THE INVENTION

According to the present invention there is provided switching arrangements for use in digital telecommunications exchange systems, comprising selector means which is arranged to interface between a plurality of time division multiplex highway groups and a plurality of channel digital traffic paths, wherein the selector means is microprocessor controlled to effect a plurality of different switching connectivity modes enabling bothway communication between the channel digital traffic paths and the time division multiplex highway groups, within the time division multiplex groups and within the channel digital traffic paths, and to effect said bothway communication when the operating input and output data rates of the particular connectivity mode is compatible or incompatible.

The invention will be better understood from the following description of an exemplary embodiment which should be read in conjunction with the accompanying drawings, in which;

BRIEF DESCRIPTION OF THE DRAWINGS

FIG. 8 shows a table 1 which illustrates the address structure of the control interface;

FIG. 9 shows a table 2 which illustrates the bit allocations of the control interface;

DESCRIPTION OF PREFERRED EMBODIMENT

Figure 1:
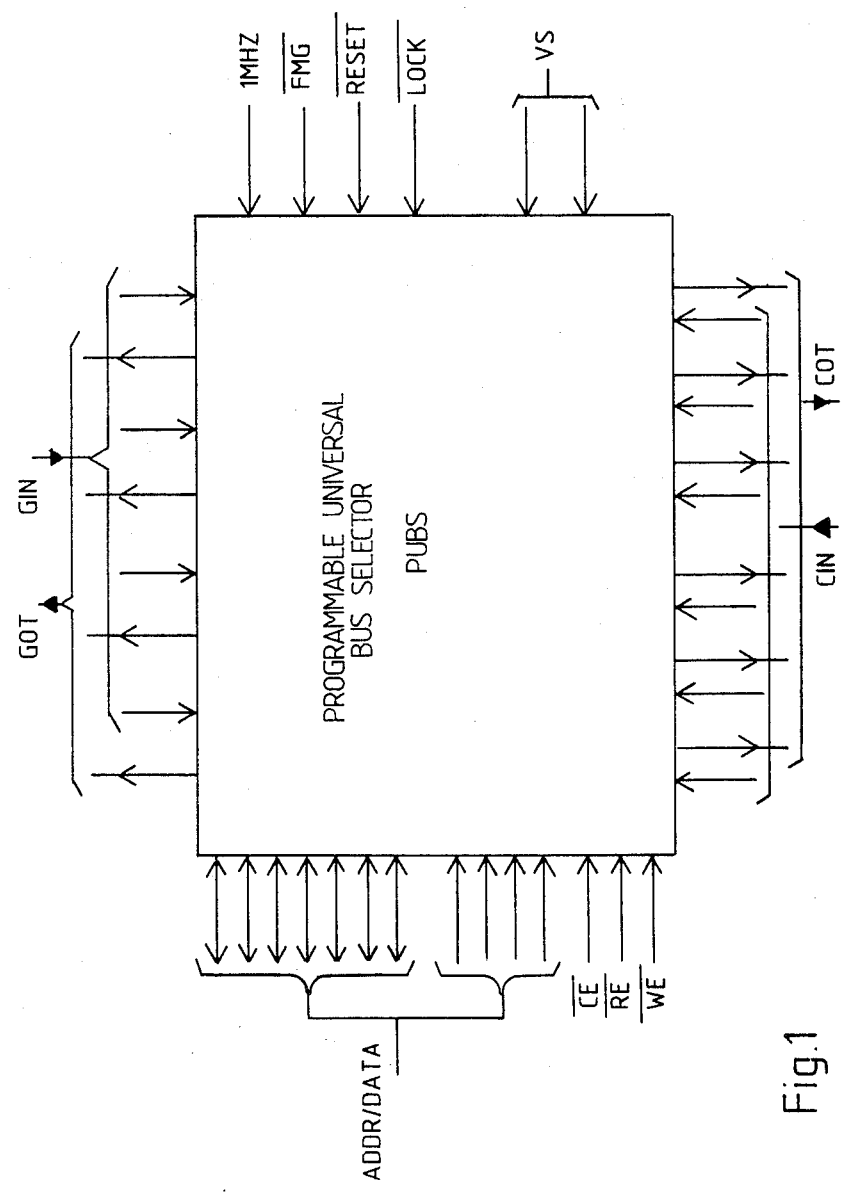
FIG. 1 illustrates a schematic diagram of the Programmable Universal Bus Selector (PUBS) including its numerous interfaces.

Referring to the drawings, the selector means is a Programmable Universal Bus Selector PUBS which provides a universal interface between four 1 Mbit/sec time division multiplexed TDM groups GOT and GIN and up to six subscriber channel rate interfaces CIN and COT operating at any one of three different channel rates of 32 Kbit/sec, 64 Kbit/sec or 1 Mbit/sec.

The PUBS is controlled by means of a microprocessor interface MFI which is used to set-up various connectivity configurations and to read these configurations by means of 16 (sixteen) 7-bit registers.

Both data and signalling is switched using the PUBS and, therefore, it finds considerable utility in subscriber multiplexing and common channel signalling.

The PUBS is packaged in a 40-pin duel-in-line case, and FIG. 1 illustrates a schematic diagram of the numerous interfaces.

The 1 MHz signal emanates from a master clock (not shown) of the telecommunications exchange system; $\overline{FMG}$ is a framing signal; $\overline{RESET}$ is a reset signal; $\overline{LOCK}$ is a signal for selecting a particular configuration of the groups; VS is the voltage supply; $\overline{CE}$ is the chip enable signal; $\overline{RE}$ is the read enable signal and $\overline{WE}$ is the write enable signal. The significance of these signals will be discussed later. The ADDR/DATA bus is the communications path for addresses and data between the microprocessor and the PUBS. The group GOS is concerned with time division multiplex (t.d.m.) communications to the t.d.m. highways TDMH while the group GIN is concerned with t.d.m. communication from the t.d.m. highways TDMH.

Traffic into the PUBS, at channel rate, enters on paths CIN while traffic out of the PUBS, at channel rate, departs on paths COT.

Figure 2:
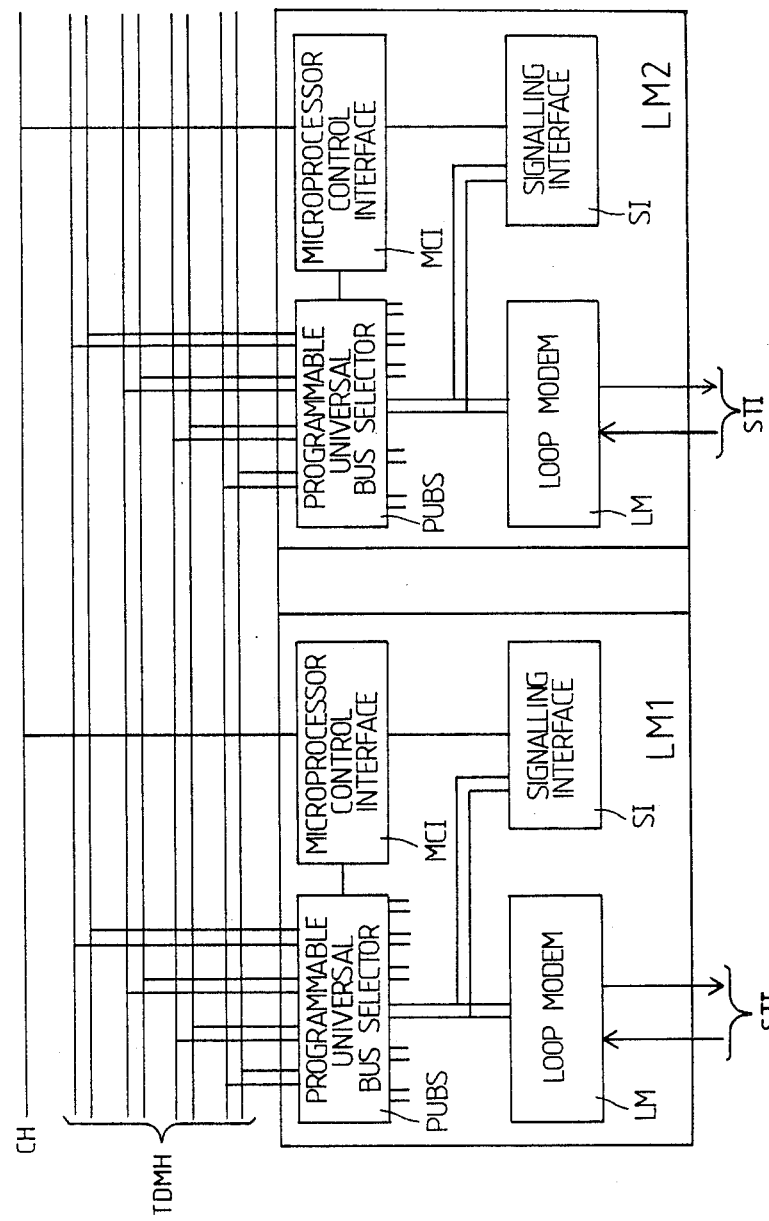
FIG. 2 illustrates a block diagram of a multiplexor application for the PUBS.

Reference to the schematic block diagram of FIG. 2 should be made to envisage a multiplexor application of the PUBS. Subscriber traffic to and from the device is handled at the subscriber traffic interface STI which is terminated on a loop modem LM. The microprocessor control interface MCI is shown linked directly with a control highway CH and with both the signalling interface SI and the PUBS. The PUBS is connected directly with the t.d.m. highways TDMH, of which there are four, signalling and traffic being selected, as appropriate, from any one of six pairs of input/output paths to/from the PUBS. A plurality of line modules is provided of which two LM1 and LM2 are shown.

Figure 3:
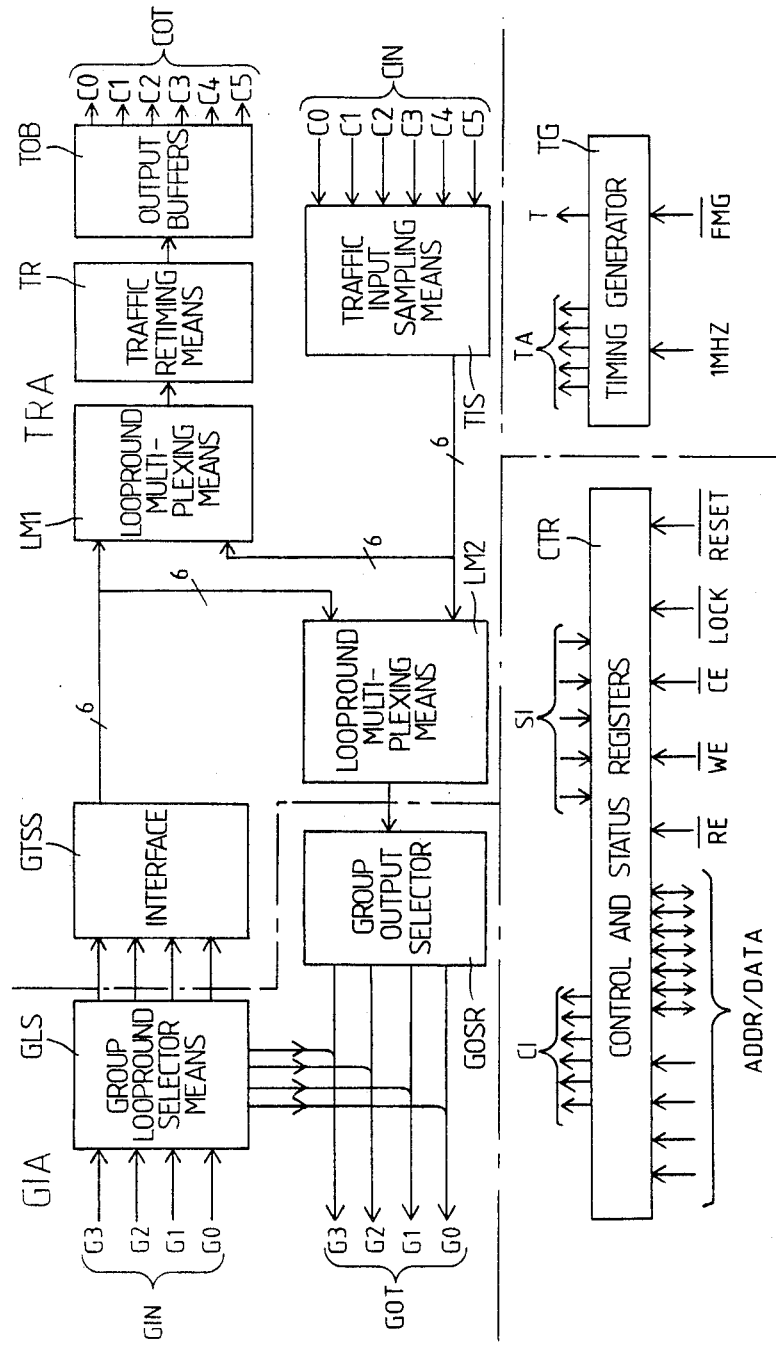
FIG. 3 illustrates a block schematic diagram of the PUBS.

A block schematic diagram of the PUBS is illustrated in FIG. 3 and it will be seen that it comprises four main areas, a timing area TIA, a control area CA, a traffic area TRA and a group interface area GIA.

Figure 7:
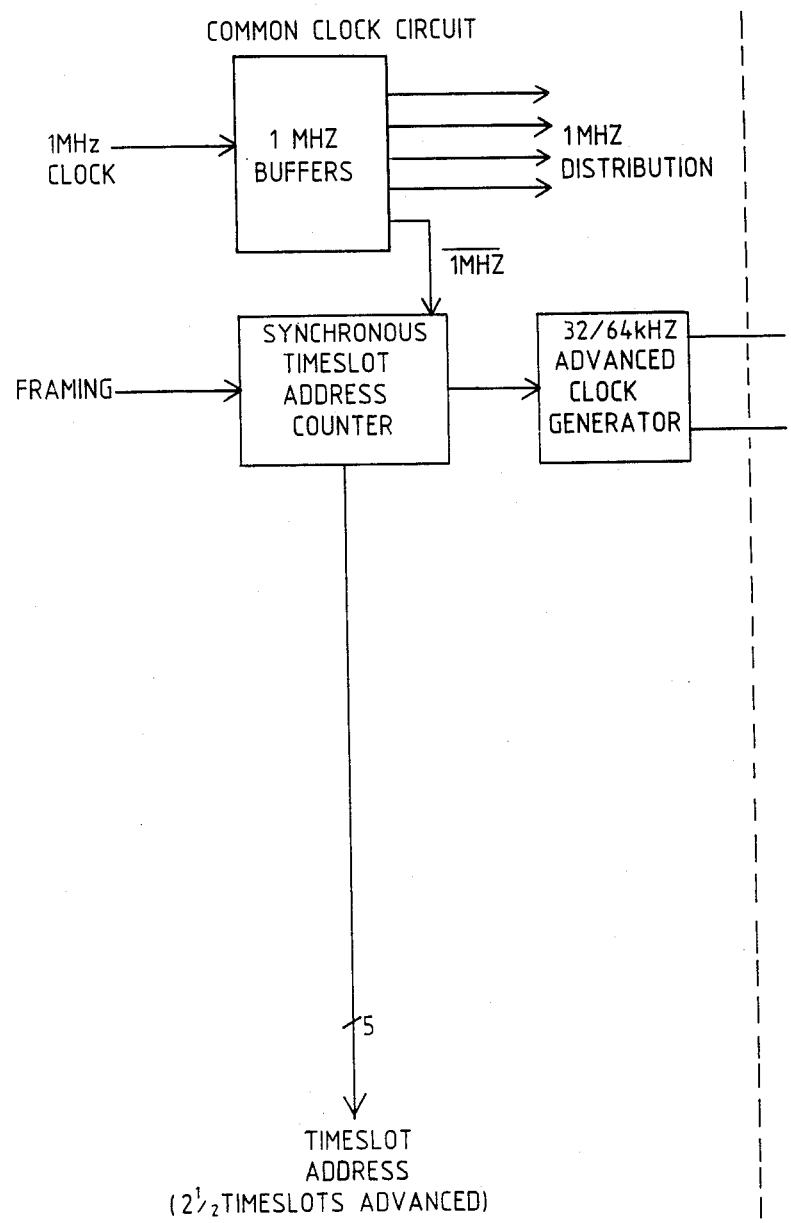
FIGS. 7 and 7a illustrate a block schematic diagram of the PUBS timing area.
Figure 7A:
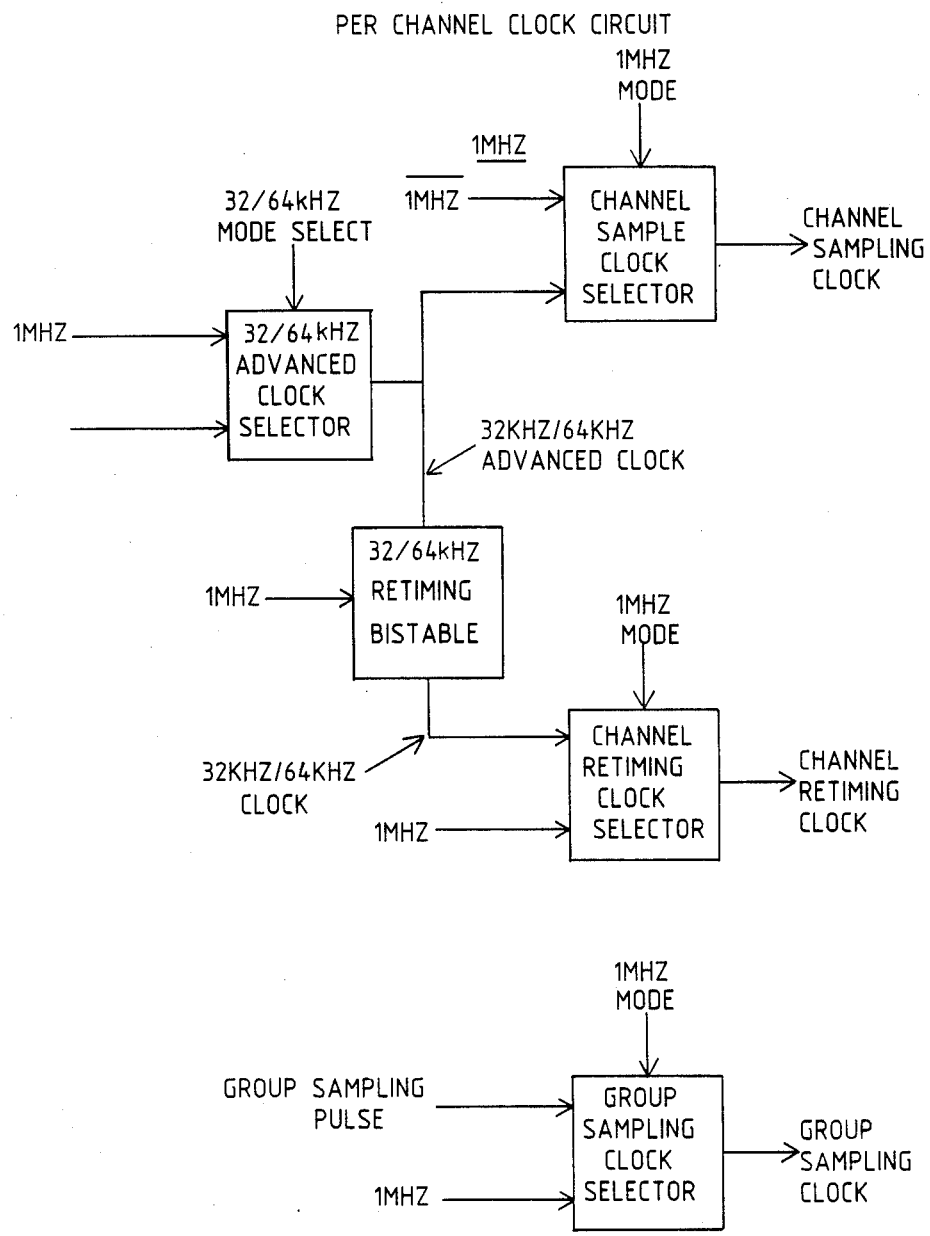

The timing area TIA provides the clock timing signals T for the PUBS together with the t.d.m. addresses TA from a timing generator TG which is fed with a 1 MHz master clock signal and a framing signal $\overline{FMG}$. A more detailed block schematic diagram of the timing area TIA is illustrated in FIG. 7.

Figure 4:
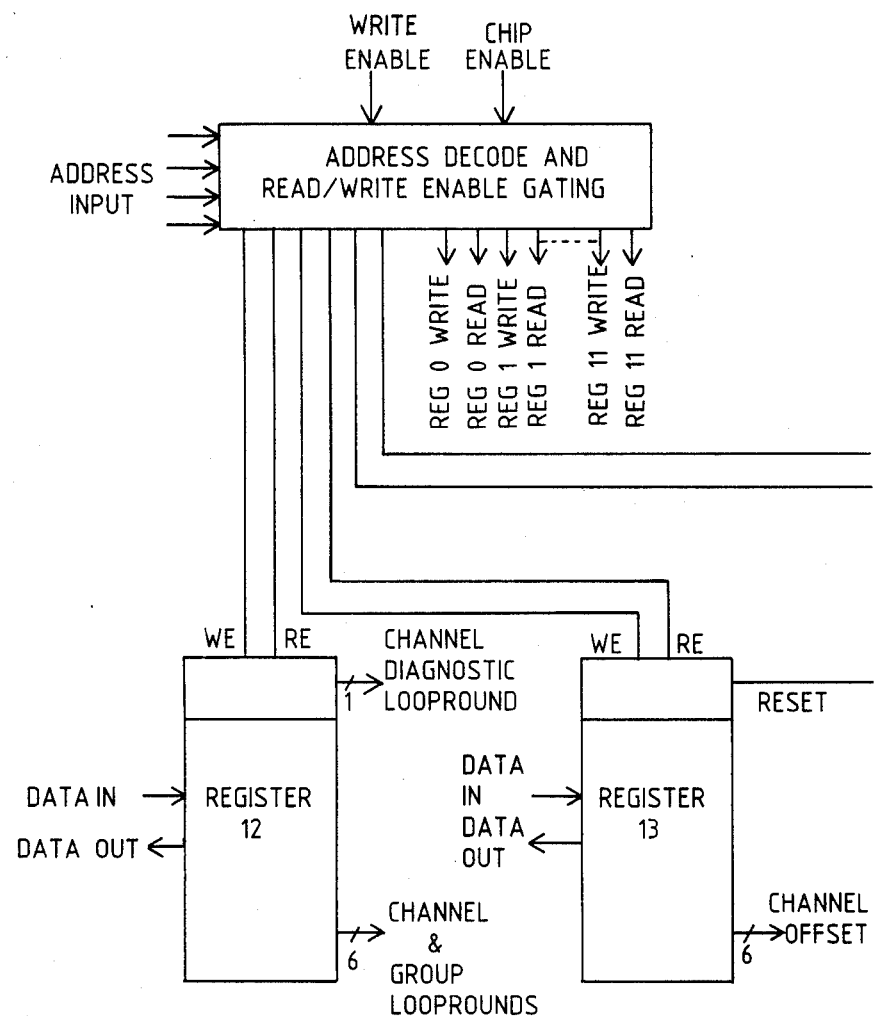
FIGS. 4 and 4a illustrate a block schematic diagram of the PUBS control area.
Figure 4A:
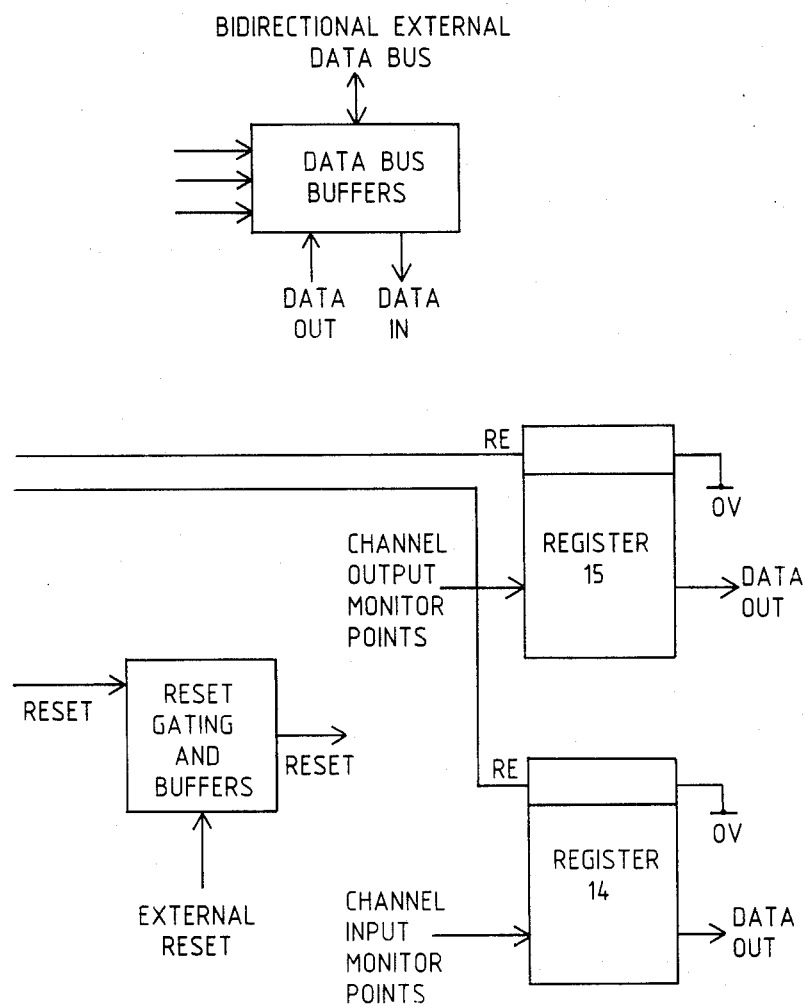

The control area CA includes control and status registers CTR and is connected with the bus ADDR-/DATA and with other control signals $\overline{RE}$, $\overline{WE}$, $\overline{CB}$, $\overline{LOCK}$ and $\overline{RESET}$. The control area serves as a control interface CI and a status interface SI. A more detailed block schematic diagram of the control area CA is illustrated in FIG. 4.

The group interface area is concerned with the connection of the t.d.m. highways TDMH (FIG. 2).

Figure 6:
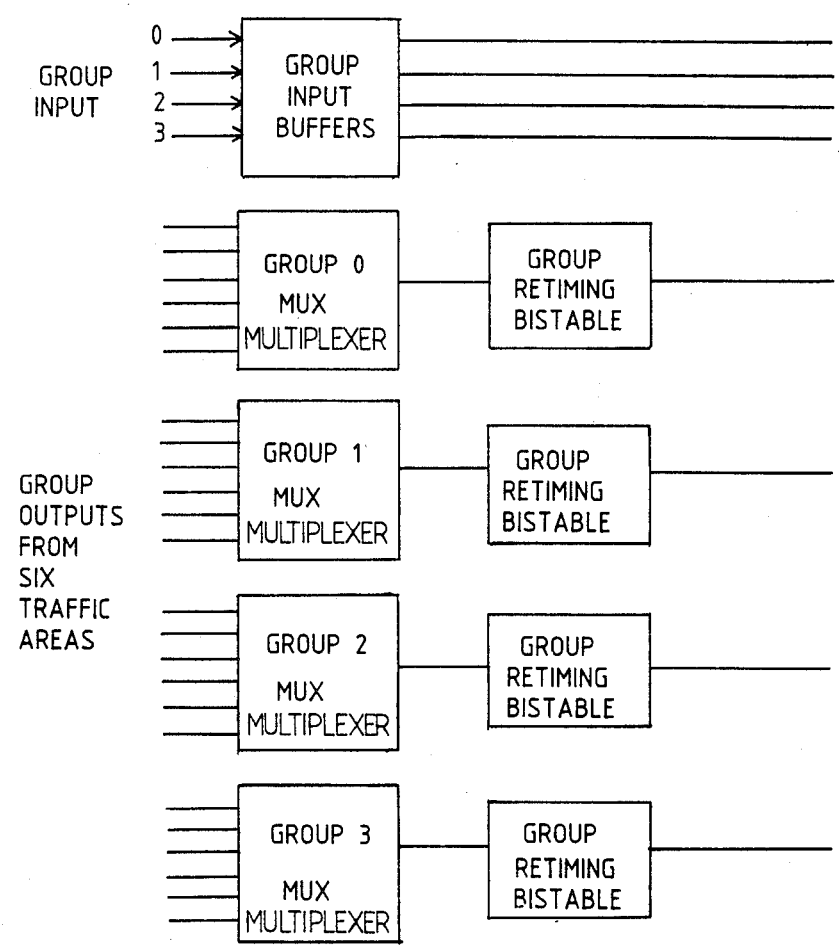
FIGS. 6 and 6a illustrate a block schematic diagram of the PUBS group interface area.
Figure 6A:
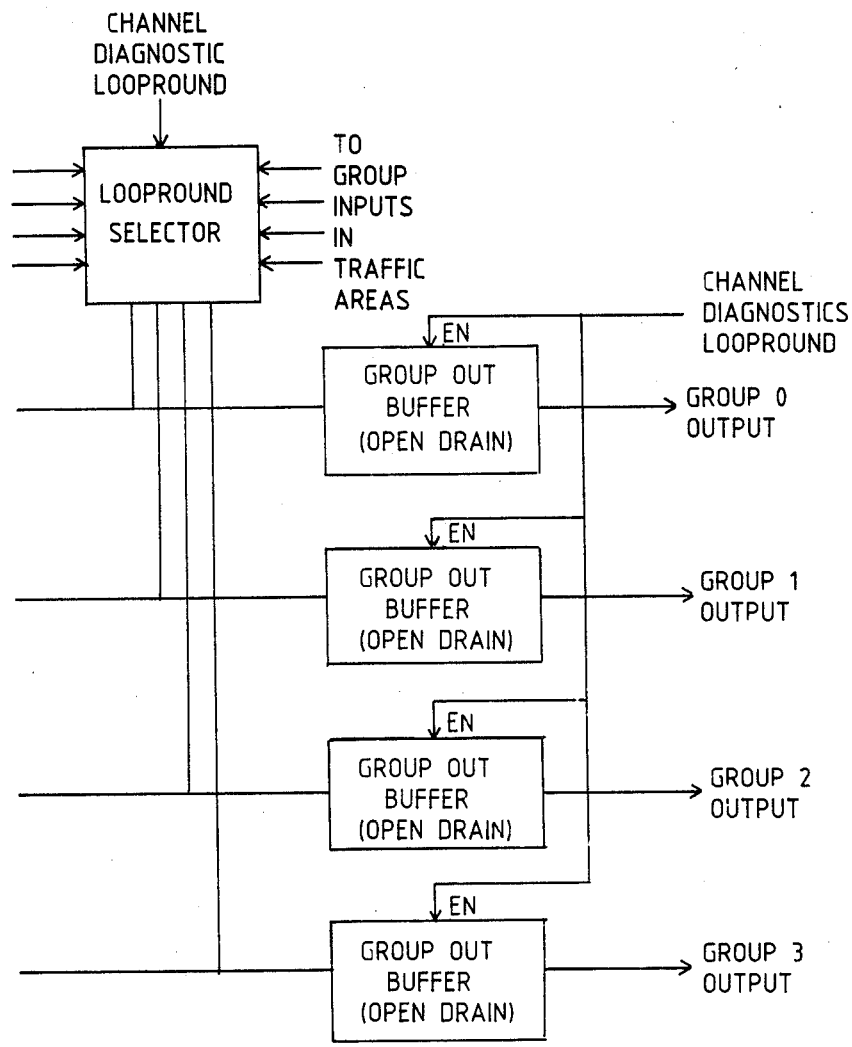

Two highway groups, the highway group in GIN and the highway group out GOT each comprise four separate paths G0 to G3. The unit GLS represents a group loopround selector means while the unit GOSR represents a group output selector and retiming means. A more detailed block schematic diagram of the group interface area GIA is illustrated in FIG. 6.

Figure 5:
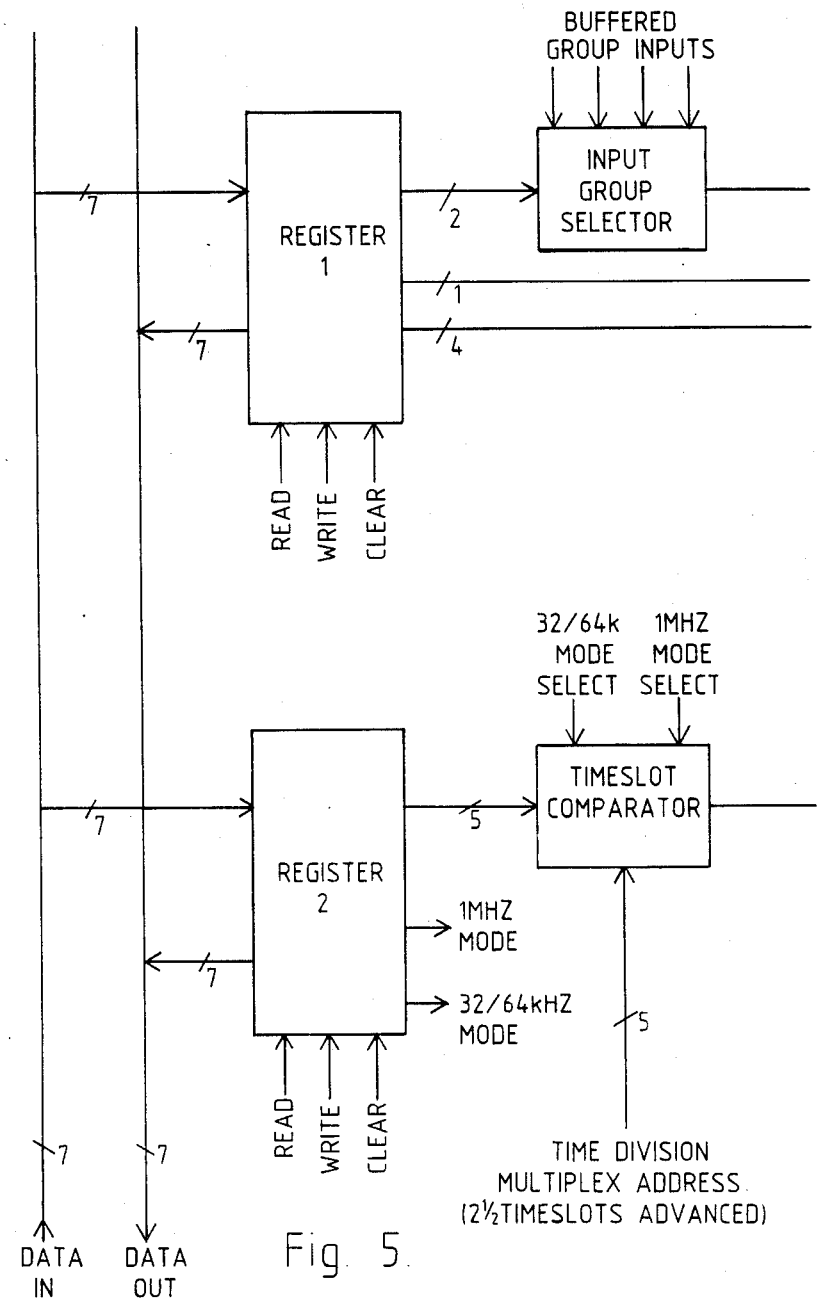
FIGS. 5, 5a and 5b illustrate a block schematic diagram of the PUBS traffic area.
Figure 5A:
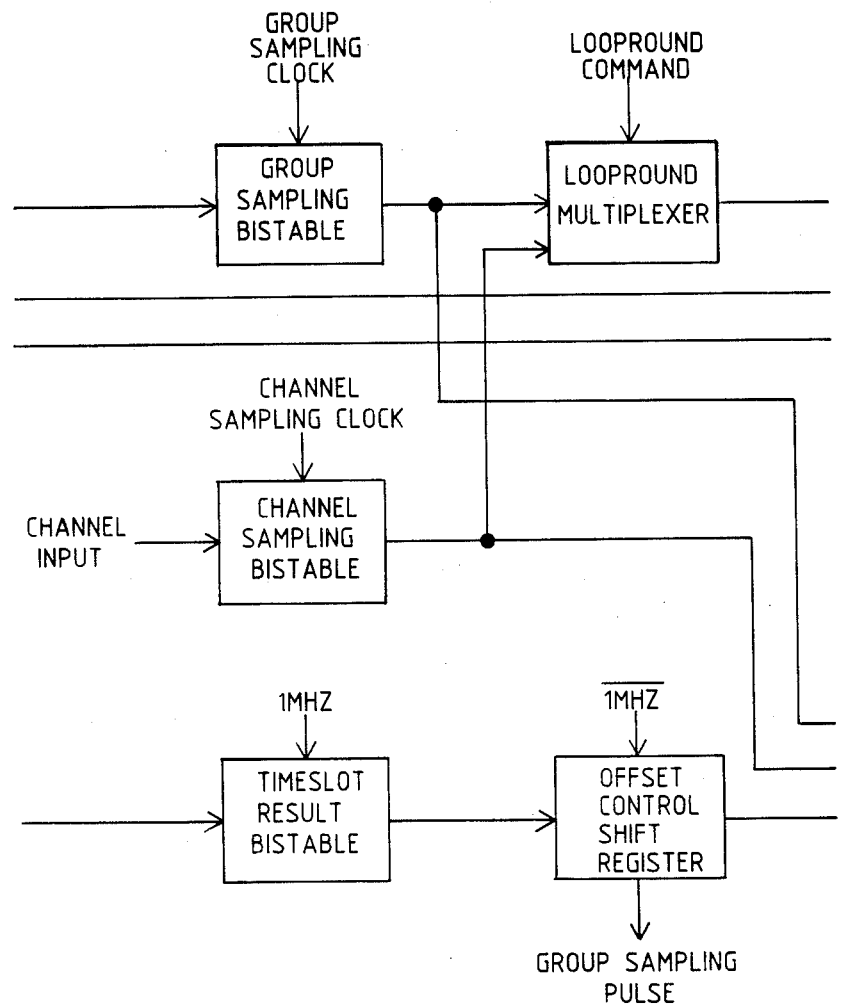
Figure 5B:
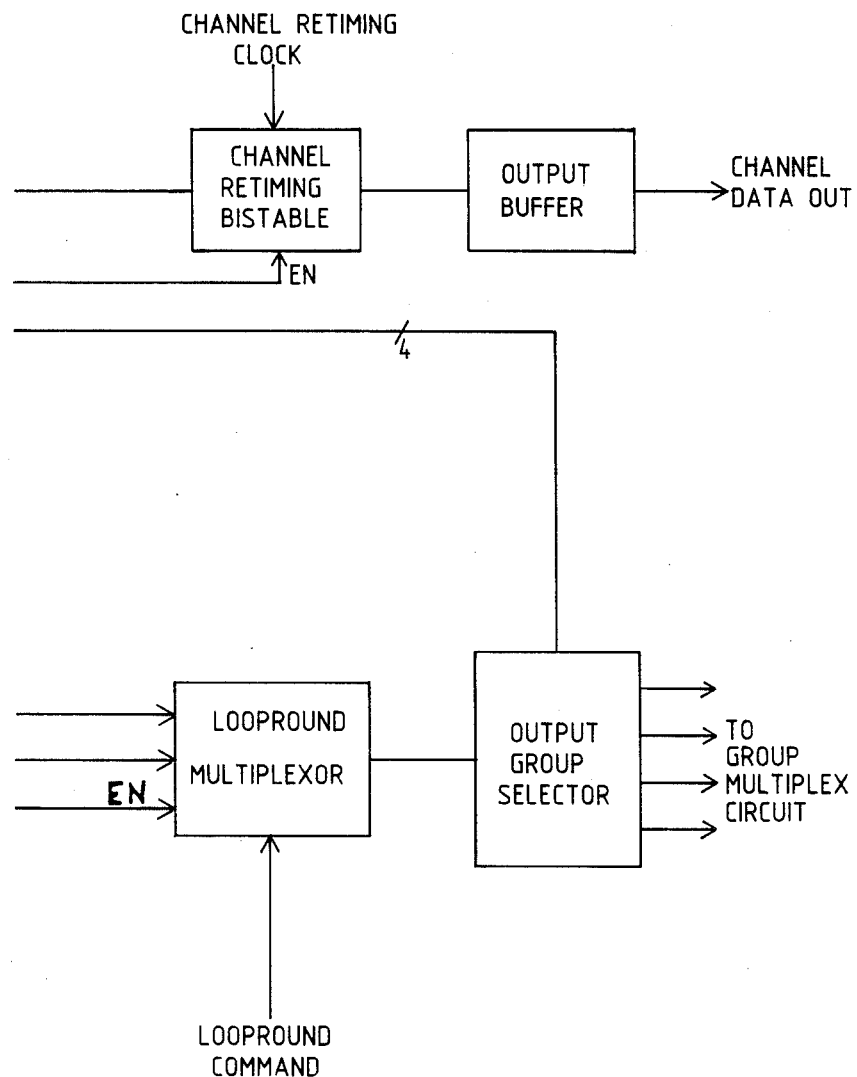

The traffic area TRA is concerned with connection to the channel traffic. The incoming channels CIN and the outgoing channels COT each comprise six separate paths C0 to C5. The unit TOB represents a plurality of output buffers while the unit TR comprises traffic retiming means. Traffic input sampling is handled by the unit TIS while the loopround multiplexing means is represented by the units LM1 and LM2. A more detailed block schematic diagram of the traffic area TRA is illustrated in FIG. 5.

General

The PUBS device is arranged to interface six 'channel terminations' C0 to C5 to four 'group terminations' G0 to G3. The channel traffic rate can be 32 Kbit/sec, 64 Kbit/sec or 1 Mbit/sec. Each group comprises 32 multiplexed channel timeslots which form a frame; the group frequency is 1 MHz, with a frame repetition rate of 32 KHz. The above frequencies are all related to the master clock rate, which is nominally 1 MHz.

The timeslot allocations on the group are determined by the framing pulse $\overline{FMG}$, which need only occur once to synchronise the PUBS, but may occur every frame, or every other frame, for convenience.

Programmable Control Facilities

The channel to timeslot selections are configured by programming the PUBS via the control interface CI. The PUBS contains 14 programmable registers and two read-only registers, for which four address lines are provided.

The control information may be loaded or read via seven bidirectional data lines under the control of the read, $\overline{RE}$, write $\overline{WE}$ and chip-enable $\overline{CE}$ lines.

The address allocations of the control interface CI are given in Table 1. The bit allocations are given in Table 2 (FIG. 9).

The control is structured around the six channel processing areas, each being allocated two consecutive control bytes in the address structure, shown as BYTE 1, and BYTE 2 in Table 1 (FIG. 8). The control functions of these bytes are described below:

Group Out Select

This 4-bit field enables the channel data on to any combination of output groups. If no groups are selected, then the group output is effectively turned off. (1 for selected).

Group Input Select

This 2-bit field selects which one of the group inputs will be used to derive the output channel data. (Coded 00 for Group 0, 01 for Channel 1, etc.)

Channel Enable

Enables the channel rate output. This output is open-drain, and hence switched off when not selected. (1 for select).

Timeslot Select

This 5-bit field is used to select the timeslot to be used on the group input and outputs. When the mode is 64 Kbit/sec, only the four least significant bits are used. When the 1 Mbit/sec mode is selected, this field is not used.

32/64 Kbit/sec Mode

This control sets 32 Kbit/sec mode when low, and 64 Kbit/sec mode when high.

1 Mbit/sec Mode

This control sets 1 Mbit/sec mode when high, and 32 or 64 Kbit/sec when low.

Figure 10:
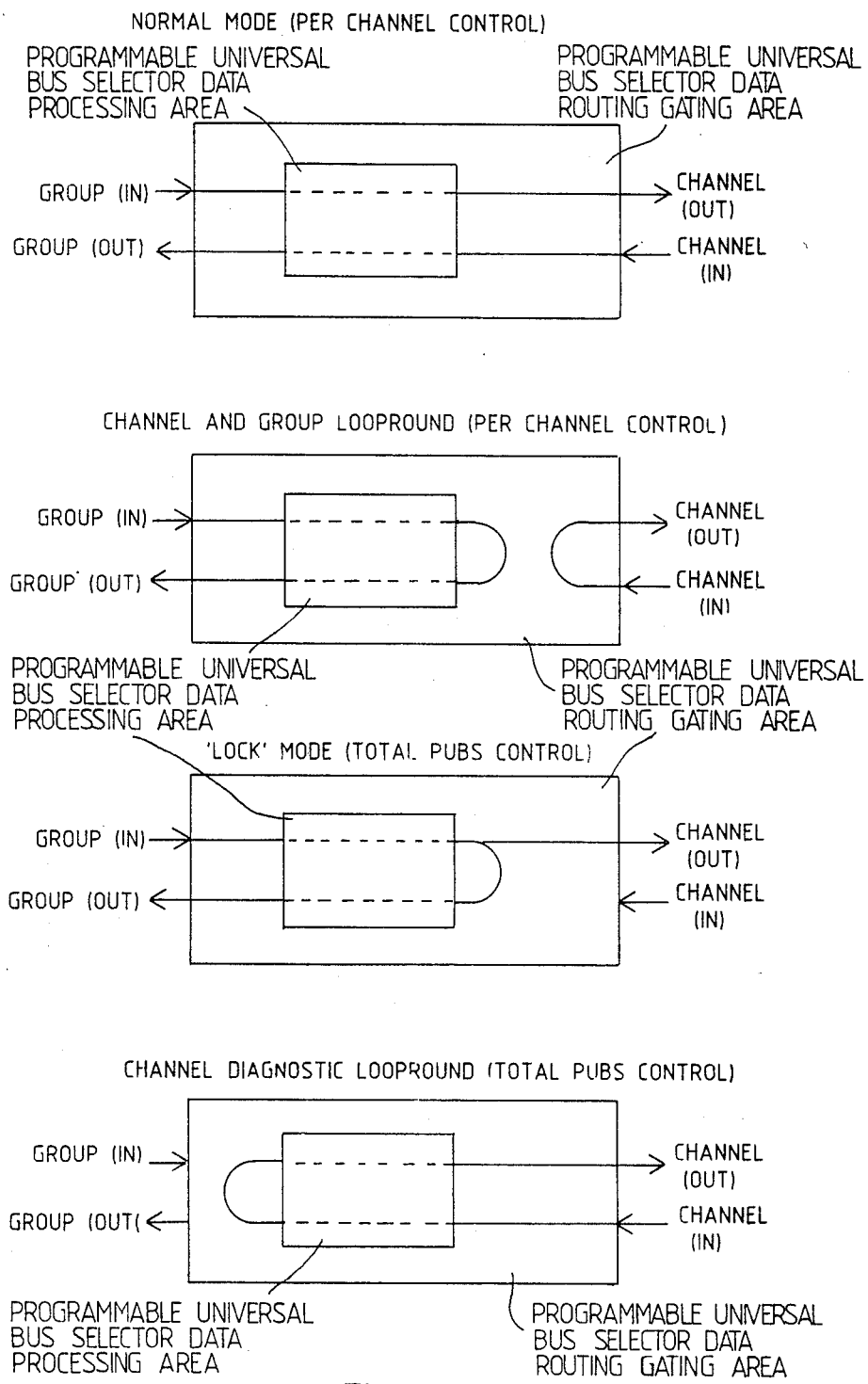
FIG. 10 illustrates a schematic diagram of the PUBS loopround modes

The addresses 12 and 13 contain diagnostic and initialisation facilities as described below. FIG. 10 shows the normal connectivity mode together with the various loopround connectivities.

Channel and Group Loopround

Byte 12 contains a 'channel and group loopround' control for each channel. When set, this loops back the channel input to channel output, and also loops the group input to group output. These loopround modes may be used for diagnostic purposes. The number, and timeslots, of group information loopedround is dependent upon the mode set.

Channel Diagnostic Loopround

This command loops back all group outputs to the group inputs within the PUBS, hence allowing the PUBS to be diagnosed from the channel connections. (1 for Loopround).

Offset

The offset facility may be selected on a per channel basis. It provides compensation for the one timeslot delay encountered on the equipment group interface line card. When offset is set, data is sampled one timeslot later, and launched one timeslot earlier than that specified in the timeslot select field.

Reset

The reset command will cause all registers, other than itself, to be cleared. This facility may be used to ease the PUBS initialisation after power-up or a system crash, and will avoid group timeslot contention due to random timeslot selection. This command, once set, must be cleared before normal operation is possible. (1 for RESET).

Channel Monitors

Channel Input Monitors

This is a read-only address which allows the controlling processor to monitor the data being input on each of the six channel input lines. As the controlling processor clock is asynchronous to the traffic clock, it is not possible to synchronously monitor each bit of data, and hence the data pattern must be determined by a sample and decode method in the controlling processor firmware. Bit 6 of this field will always be a 0.

Channel Output Monitors

This is a read-only address which allows the controlling processor to monitor the data being output on each of the six channel output lines. Data may even be read if the channel output enable bit is not set, which permits a comprehensive traffic path diagnostic facility to be provided when using an external traffic source. Bit 6 of this field will always be a 0.

Hardware Control Facilities

Two hardware control lines are provided as described below.

RESET

When this line is held low, the total PUBS is reset. This line will normally be connected to a power-up reset or manual reset facility.

LOCK

This facility causes a group loopround to be set on all channels, which will allow an equipment control-ring system to be implemented.

Programming Control

The control lines used during programming or monitoring the PUBS are described below.

CHIP ENABLE (CE)

This signal must be held low for a read or write operation to take place. When this signal is not set, it will cause all address and data lines to be disabled, which will ensure that the power used by the chip is minimised when other devices are connected to the control bus.

READ (RE)

When this signal and CHIP ENABLE (CE), are held low, the data held in the addressed register is enabled out onto the tri-state data interface.

WRITE (WR)

Data input on the tri-state data bus is clocked into an addressed register when the logical sum of WRITE (WE) or CHIP ENABLE (CE) goes from a low to high state.

DESCRIPTION OF MODES

General

The device incorporates the following modes of operation, which are described below.
a. 32 Kbit/sec channel to 1 Mbit/sec group mode.
b. 64 Kbit/sec channel to 1 Mbit/sec group mode.
c. 1 Mbit/sec channel to 1 Mbit/sec group mode.
d. Channel and group loopround mode.
e. Channel diagnostics loopround mode.
f. LOCK loopround mode.

32 Kbit/sec Channel to 1 Mbit/sec Group Mode
Outgoing Direction

Figure 11:
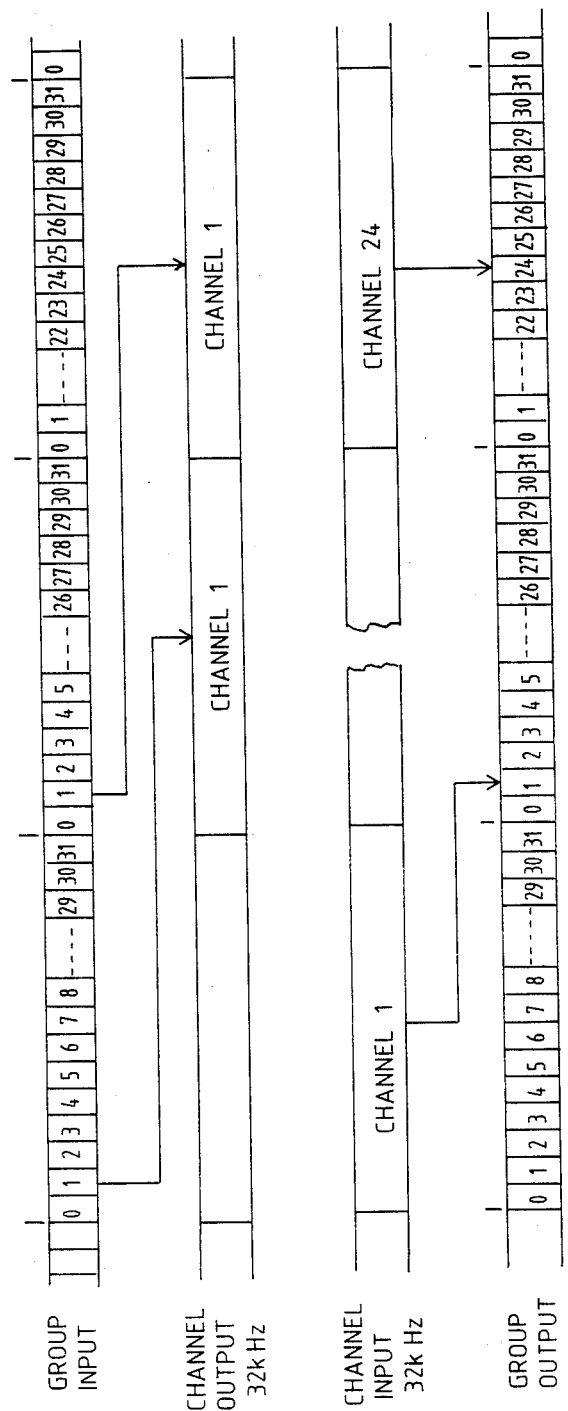
FIG. 11 shows a diagram of the data stream relating to the 32 KHz non-offset mode connectivity.

In this direction, one channel of the 32 channel 1 Mbit/sec group is selected and output as a 32 Kbit/sec data stream on a channel output as shown in FIG. 11.

If 'offset' is not set, then data will be sampled on the trailing edge of the 1 Mbit clock in the centre of the selected channel. If 'offset' is set, the data will be sampled one period of 1 MHz clock later.

The data on the channel interface will be launched at the start of the group frame period.

Data sampled in one frame will always appear on a channel output during the next frame, with exception of channel 31 in offset mode, which will appear one frame later.

Incoming Direction

In this direction, data on a channel interface is multiplexed into one channel of the 1 Mbit/sec group as shown in FIG. 11. Data is sampled half a 1 MHz period before the centre of the frame.

If 'offset' mode is not set, then data is inserted into the timeslot selected, and is launched on the leading edge of the 1 MHz clock. Data required for channels 16 to 31 will not experience any delay, whereas data for channels 0 to 15 will experience up to half a frame delay.

If 'offset' mode is set, then data is inserted into the timeslot immediately preceding the selected one. Data required for channels 17 to 31 will not experience any delay, whereas data for channels 0 to 16 will experience up to half a frame delay.

64 Kbit/sec Channel to 1 Mbit/sec Group Mode
Outgoing Direction

Figure 12:
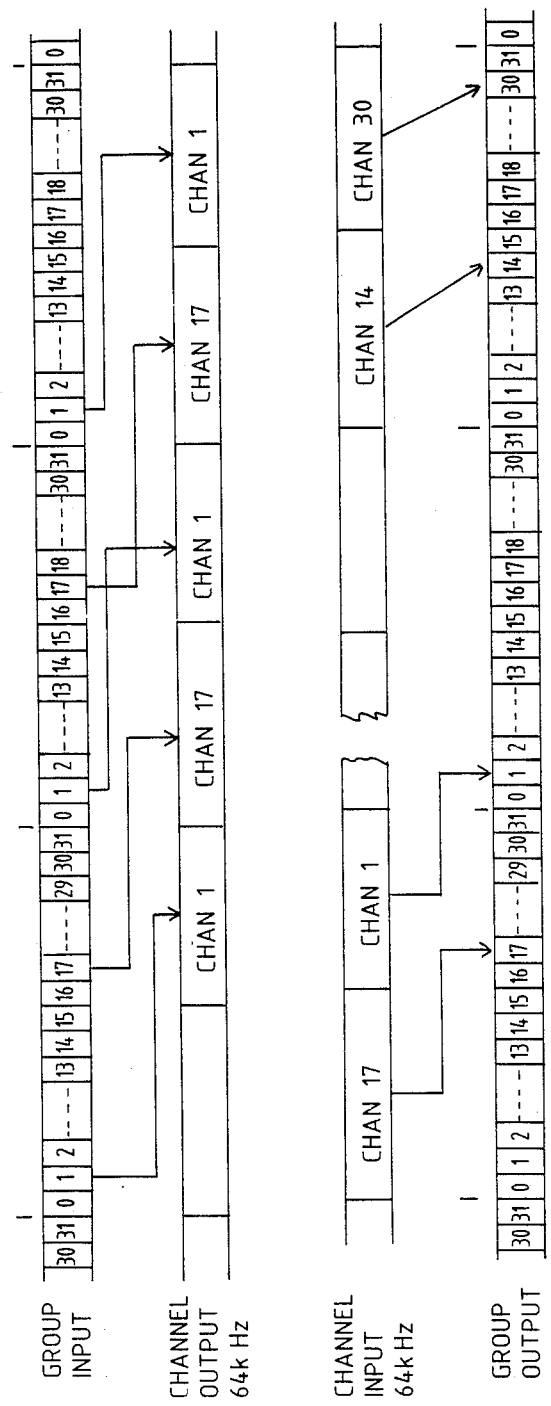
FIG. 12 shows a diagram of the data stream relating to the 64 KHz non-offset mode connectivity.

In this direction, two channels of the 32 channel 1 Mbit/sec group are selected and output as a 64 Kbit/sec data stream on a channel output as shown in FIG. 12. The two 1 Mbit/sec channels used must be spaced by 16 periods of 1 MHz.

If 'offset' mode is not set, data is inserted into the timeslot selected and the one offset by 16 periods of 1 MHz. Data is sampled on the trailing edge of the 1 MHz clock.

If 'offset' mode is set, data is selected one 1 MHz period later.

The data on the channel interface will be launched at the start and halfway through the frame period. Data sampled in one half frame will always appear on the channel output during the next half frame, with the exception of channel 16 in offset mode, which will appear one frame later.

Incoming Direction

In this direction, data on a channel interface is multiplexed into two channels of the 1 Mbit/sec group as shown in FIG. 12. Data is sampled half a 1 MHz period before $\frac{1}{4}$ and $\frac{3}{4}$ through the frame.

If 'offset' mode is not set, then data is inserted into the timeslot selected and also the one offset by 16 periods of the 1 MHz clock; it is launched on the leading edge of the 1 MHz clock. Data in channels 8 to 15 will not experience any delay, whilst data in channels 0 to 7 will experience a quarter frame delay.

If 'offset' mode is set, then data is inserted into the timeslot immediately preceding the selected one. Data for channels 9 to 15 will not experience any delay, whilst data for channels 0 to 8 will experience a quarter frame delay.

1 Mbit/sec Channel to 1 Mbit/sec Group Mode
Outgoing Direction

Figure 13:
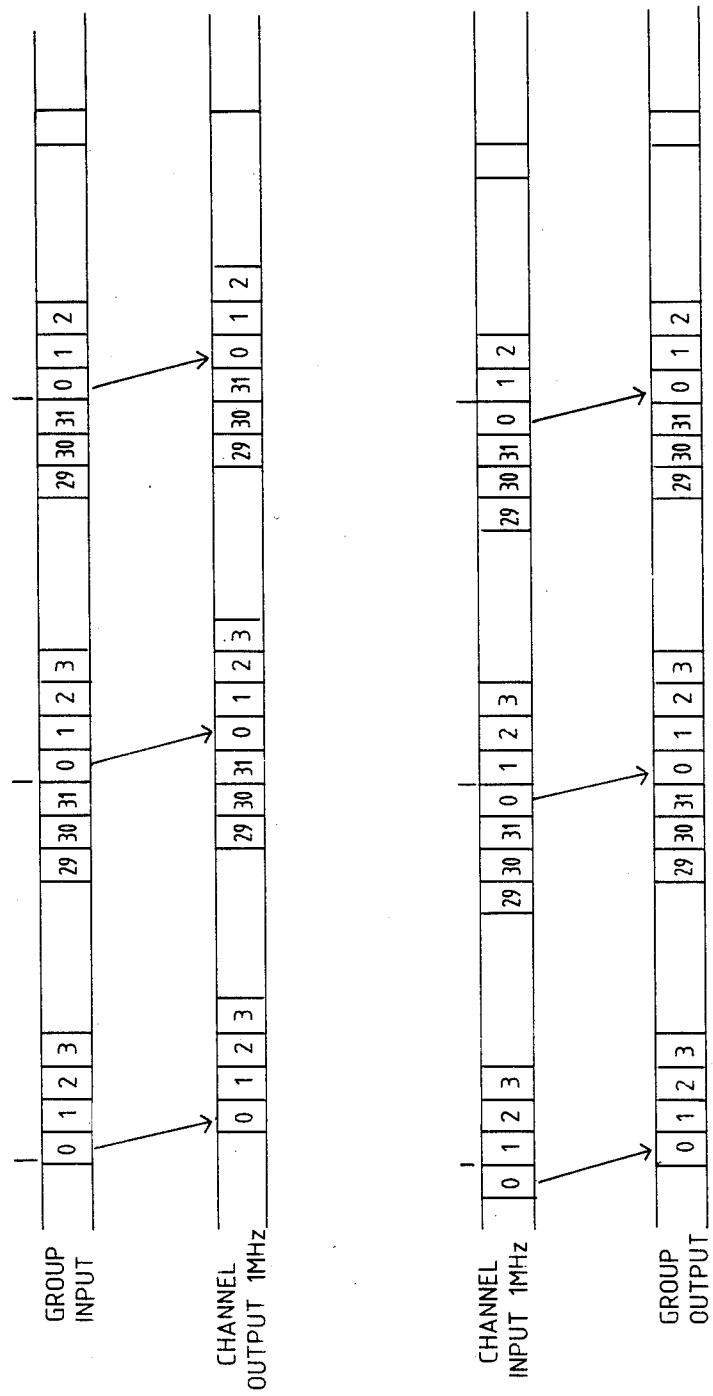
FIG. 13 shows a diagram of the data stream relating to the 1 MHz mode connectivity.

In this direction, the whole 1 Mbit/sec group on the group interface is connected to the channel output as shown in FIG. 13.

Data is sampled on the trailing edge of the 1 MHz clock, and is launched on the leading edge of the clock. Data will be delayed by one period of the 1 MHz clock.

Offset mode is inoperative in this mode.

Channel and Group Loopround Mode When this mode is in operation, the channel input is looped to the channel output, and the group input to the group output.

Channel Loopround

Data is sampled on:
a. The trailing edge of the 1 MHz clock in timeslot 15 in 32 Kbit/sec mode.
b. The trailing edge of the 1 MHz clock in timeslots 7 and 23 in 64 Kbit/sec mode.
c. The trailing edge of each 1 MHz clock in 1 Mbit/sec mode.

Data is launched on:
a. The start of frame in 32 Kbit/sec mode.
b. The start of timeslots 0 and 16 in 64 Kbit/sec mode.
c. The leading edge of each 1 MHz clock in 1 Mbit/sec mode.

Offset mode does not affect the channel loopround.
The data is delayed by one period of whichever clock is selected.

Group Loopround

Data is sampled:
a. During the 32 Kbit/sec mode, on the trailing edge of the 1 MHz clock in the selected timeslot in non-offset mode, or one timeslot later in offset mode.
b. During 64 Kbit/sec mode, on the trailing edge of the 1 MHz clock in the selected timeslot and one separated by 16 timeslots from the selected one during non-offset mode. When offset mode is set, data is sampled one timeslot later.
c. During the 1 Mbit/sec mode, on the trailing edge of each 1 MHz clock.

Data is launched:
a. In the 32 Kbit/sec mode, at the start of the selected timeslot during non-offset mode, and one timeslot earlier in the offset mode.
b. In the 64 Kbit/sec mode, at the start of the selected timeslot and one separated by 16 timeslots from the selected one during non-offset mode. In offset mode, data is launched one timeslot earlier.
c. In the 1 Mbit/sec mode, on the leading edge of each 1 MHz clock.

General

This mode allows the PUBS to be fully diagnosed from the group and channel interfaces, with the exception of two gates.

Channel Diagnostics Loopround Mode

In this mode, the group output of the total PUBS is looped round to the group input, and hence does not permit selective loopround as in other modes.

This mode will allow traffic paths of the PUBS to be diagnosed from the channel connections.

Offset mode tests may only be performed using two channels when this mode is in operation.
The data delays are as follows:
a. 32 Kbit/sec mode.
If timeslots 16 to 31 are selected, data is delayed by one period of 32 KHz. If timeslots 0 to 15 are selected, data is delayed by two periods of 32 KHz.
b. 64 Kbit/sec mode.
If timeslots 8 to 15 or 24 to 31 are selected, then data is delayed by one period of 64 KHz. If timeslots 0 to 7 or 16 to 23 are selected, the data is delayed by two periods of 64 KHz.
c. 1 Mbit/sec mode.
Data is always delayed by two periods of 1 MHz.

LOCK Loopround Mode

This mode is invoked by lowering the $\overline{\text{LOCK}}$ pin on the PUBS. It provides a loopround of the incoming group, but permits normal operation from the group to the channel. The channel input is not used. The software selectable group and channel loopround mode overrides the LOCK function.

INTERFACE DESCRIPTION (TIMING)

The timings given in this section represent the worst case delays over the permitted process spreads and an operating temperature range of −55° C. to +125° C.

Control Timing

General

Figure 14:
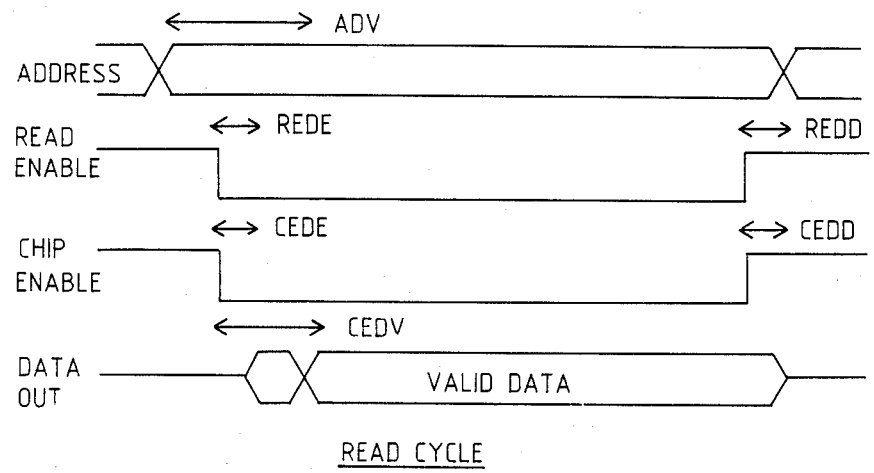
FIG. 14 shows a diagram concerning waveforms relating to the control timing; and, FIG. 15 shows various waveforms concerned with the timing references.
Figure 14:
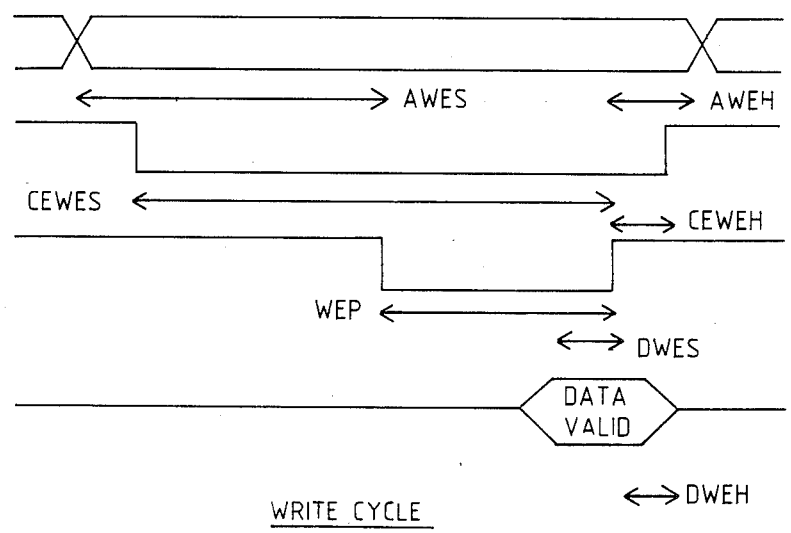

The following timing figures apply to the control interfaces of the Programmable Universal Bus Selector. A load of 50 pF has been assumed on the data BUS. Reference should be made to FIG. 14.

Read Cycle

Read Enable to data bus Control ($\overline{\text{CE}}$ Low)

$\overline{\text{RE}}$ low to data bus enabled (data=0) (REDE)=66 mS max.
$\overline{\text{RE}}$ low to data bus enabled (data=1) (REDE)=90 mS max.
$\overline{\text{RE}}$ high to data bus disabled (data=0) (REDD)=38 mS max.
$\overline{\text{RE}}$ high to data bus disabled (data=1) (REDD)=46 mS max.

Chip Enable to data bus Control ($\overline{\text{RE}}$=0)

$\overline{\text{CE}}$ low to data bus enabled (data=0) (CEDE)=70 mS max.
$\overline{\text{CE}}$ low to data bus enabled (data=1) (CEDE)=92 mS max.
$\overline{\text{CE}}$ high to data bus disabled (data=0) (CEDD)=40 mS max.
$\overline{\text{CE}}$ high to data bus disabled (data=1) (CEDD)=48 mS max.

Address Change to Data Valid ($\overline{\text{CE}}$ and $\overline{\text{RE}}$ low) (ADV)

Address stable to data valid (data=0)=125 nS max.
Address stable to data valid (data=1)=200 nS max.

Chip enable to Data Valid ($\overline{\text{RE}}$ low) (CEDV)

$\overline{\text{CE}}$ low to data valid (data=0)=125 nS max.
$\overline{\text{CE}}$ low to data valid (data=1)=200 nS max.

Write Cycle

Data Set up before rising edge of ($\overline{\text{WE}}$) DWES
(Data=1)=71 nS min.
Data Hold after rising edge of ($\overline{\text{WE}}$) DWEH
(Data=0)=30 nS min.
(Data=1)=32 nS min.

Address Set up before falling edge of ($\overline{\text{WE}}$) AWES
Set up=21 nS min.

Address hold after rising edge of ($\overline{WE}$) AWEH

Hold = 13nS min.

CE set up before rising edge of ($\overline{WE}$) (CEWES)

$\overline{CE}$ set up = 80 nS min.

$\overline{CE}$ set up before rising edge of (WE) (CEWES)

$\overline{CE}$ set up = 80 nS min.

$\overline{CE}$ hold after rising edge of (WE) (CEWEH)

$\overline{CE}$ set up = 33 nS min.

$\overline{WE}$ pulse Width (WEP)

$\overline{WE}$ pulse width = 64 nS.

RESET Pulse Width

RESET pulse = 60 nS min.

Traffic Area Timing

General

Figure 15:
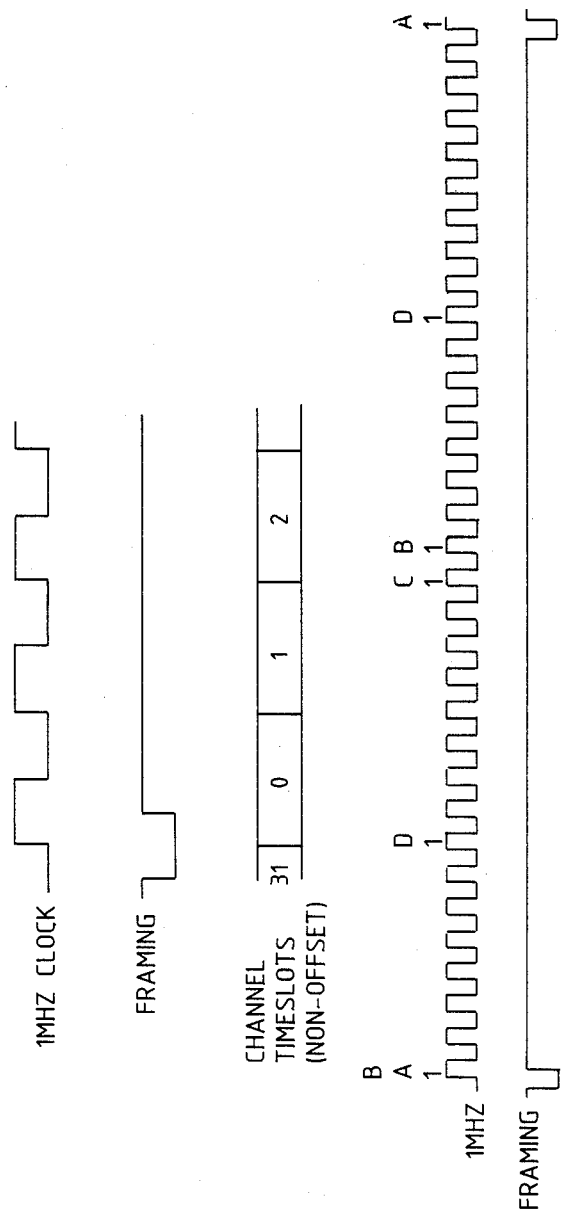

The following timing figures apply to the traffic areas of the Programmable Universal Bus Selector. Reference should be made to FIG. 15.

Group Interface Timing

A load of 400 pF has been assumed on the group outputs for high to low transitions. The rise time on the group bus will be determined by the value of the pull up resistor used and should be added to the figures given.

Group Output

1MHz clock high to group output (Data=0)=100 nS max.
1MHz clock high to group output (Data=1)=58 nS max.

Group Input

Group Input Set up before 1 MHz falling edge.

| | |
|---|---|
| 32 or 64 Kbit/sec mode | (Data = 0) = 32 nS min. |
| 32 or 64 Kbit/sec mode | (Data = 1) = 28 nS min. |
| 1 Mbit/sec mode | (Data = 0) = 39 nS min. |
| 1 Mbit/sec mode | (Data = 1) = 35 nS min. |
| Group Input Hold time after 1 MHz falling edge | |
| 32 or 64 Kbit/sec mode | (Data = 0) = 70 nS min. |
| 32 or 64 Kbit/sec mode | (Data = 1) = 70 nS min. |
| 1 Mbit/sec mode | (Data = 0) = 40 nS min. |
| 1 Mbit/sec mode | (Data = 1) = 40 nS min. |

Channel Interface Timing

A load of 50 pF has been assumed on the group outputs for high to low transitions. The rise time on the group bus will be determined by the value of the pull up resistor used and should be added to the figures given.

Group Output

Channel output valid from rising edge of 1 MHz clock point.

| | |
|---|---|
| A 32 Kbit/sec mode | (Data = 0) = 94 nS max. |
| A 32 Kbit/sec mode | (Data = 1) = 80 nS max. |
| B 64 Kbit/sec mode | (Data = 0) = 94 nS max. |
| B 64 Kbit/sec mode | (Data = 1) = 80 nS max. |
| 1 Mbit/sec mode | (Data = 0) = 72 nS max |
| 1 Mbit/sec mode | (Data = 1) = 58 nS max. |

Channel Input

Channel input Set-up time before falling edge of 1 MHz clock at point.

| | |
|---|---|
| C for 32 Kbit/sec mode | (Data = 0) = 0 nS min. |
| C for 32 Kbit/sec mode | (Data = 1) = −8 nS min. |
| D for 64 Kbit/sec mode | (Data = 0) = 0 nS min. |
| D for 64 Kbit/sec mode | (Data = 1) = −8 nS min. |
| 1 Mbit/sec mode | (Data = 0) = 14 nS min. |
| 1 Mbit/sec mode | (Data = 1) = 6 nS min. |

Channel input Hold time after falling edge of 1 MHz clock at point.

| | |
|---|---|
| C for 32 Kbit/sec mode | (Data = 0) = 142 nS min. |
| C for 32 Kbit/sec mode | (Data = 0) = 140 nS min. |
| D for 64 Kbit/sec mode | (Data = 0) = 142 nS min. |
| D for 64 Kbit/sec mode | (Data = 0) = 140 nS min. |
| 1 Mbit/sec mode | (Data = 0) = 48 nS min. |
| 1 Mbit/sec mode | (Data = 0) = 45 nS min. |

Framing

Falling edge of 1 MHz clock to the falling edge of the framing pulse = 72 nS min.

Rising edge of framing pulse to the falling edge of the 1 MHz clock = 21 nS min.

Minimum width of framing pulse 45 nS.

We claim:

1. Switching arrangement for use in digital telecommunications exchange systems wherein said arrangements include a traffic area, a group interface area, a control area and a timing area, and comprises selector means which is arranged to interface between a plurality of time division multiplex highway group terminations and a plurality of input and output channel digital traffic paths, wherein the selector means is microprocessor controlled to effect a plurality of different switching connectivity modes enabling bidirectional communication between the input and output channel digital traffic paths, and, between the time division multiplex highway group terminations, and to effect said bidirectional communication when the operating input and output data rates of the particular connectivity is either compatible or incompatible, the selector means further includes clock timing means, located in the timing area, driven from a master clock signal to provide internal selector means timing, and a plurality of first register means and a second register means arranged to be controlled by the microprocessor, said first register means is provided for each of the plurality of input and output channel digital traffic paths, and said second register means is provided in common with all said traffic paths, a loopround control register means, located in the control area, is connected to the group interface and traffic areas and arranged to control connectivity of the traffic paths and of the highway group terminations, an offset control, located in the control area, is connected to the group interface area and arranged to control the timeslot being read from the highway group terminations, and being written to the highway group terminations, and a channel monitor control, located in the control area, is connected to the traffic area and arranged to monitor the input and output channel traffic paths.

2. Switching arrangements as claimed in claim 1, in which said first register means is structured into two separate bytes, in which the first byte comprises a four-bit field to enable channel data to any combination of outputs to the highway groups, a two-bit field to select which of the inputs from the highway groups will be used to derive output channel data, and a one-bit field to enable the channel rate output, and in which the second byte comprises, a five-bit field to select the timeslot to be used on the highway input and output groups, a one-bit field to control which of two separate data rate modes of operation and a further one-bit field to control a further and different data rate mode of operation.

3. Switching arrangements as claimed in claim 2, in which loopround control register means is structured to include a one-bit field for each of the plurality of channel traffic paths and a one-bit field for diagnostic connectivity purposes, the offset control register means is structured to include a one-bit field for each of the plurality of channel traffic paths and a one-bit field for register reset control, the channel monitor control register means is structured to includes a one-bit field for each of the channel traffic paths.

4. Switching arrangements as claimed in claim 3, in which the selector means includes multiplexing means which when a channel traffic path bit is set arranges that the associated channel input is looped back to the corresponding channel output and the input highway group is looped back to the corresponding output highway group.

5. Switching arrangements as claimed in claim 3, in which the selector means includes a loopround selector which when the diagnostic connectivity bit is set arranges for all the output highway groups to be looped back to the corresponding input highway groups within the selector means permitting the selection means to be diagnosed from the channel traffic paths.

6. Switching arrangements as claimed in claim 3, in which when an offset bit is set, compensation for a one timeslot delay encountered in highway group interface equipment is initiated, whereby data is sampled one timeslot later and data is launched one timeslot earlier than that specified within the timeslot select field of said second byte.

7. Switching arrangements as claimed in claim 3, in which the channel monitor register means are read-only devices, wherein when a channel monitor bit is set, the controlling microprocessor monitors the data being input or output on each of the channel traffic input or output paths respectively.

8. Switching arrangements as claimed in claim 3, in which a lock control is provided to the selector means which, when set, causes a highway group loopround connectivity to be set on all channel traffic paths.

* * * * *